United States Patent

Hartel

[11] 4,007,894
[45] Feb. 15, 1977

[54] METHOD AND APPARATUS FOR MINIMIZING AXIAL FRICTION FORCES IN A CYLINDER-PISTON SHOCK ABSORBER

[75] Inventor: Erwin H. Hartel, Bellevue, Wash.

[73] Assignee: The Boeing Company, Seattle, Wash.

[22] Filed: Dec. 4, 1975

[21] Appl. No.: 637,576

[52] U.S. Cl. .................. 244/104 FP; 177/141; 267/64 R
[51] Int. Cl.² .................................. B64C 25/60
[58] Field of Search ............ 244/104 R, 104 FP; 73/37, 37.5, 65; 177/136, 141; 267/64 R

[56] References Cited

UNITED STATES PATENTS 3,652,040  3/1972  Hartel .......................... 244/104 R

*Primary Examiner*—Trygve M. Blix
*Assistant Examiner*—Barry L. Kelmachter
*Attorney, Agent, or Firm*—Christensen, O'Connor, Garrison & Havelka

[57] ABSTRACT

The weight and balance of an aircraft is determined by measuring the pressure of a fluid in a variable volume chamber provided in a piston-cylinder shock absorber assembly of the landing gear strut. In order to minimize axial friction forces in the assembly that introduce errors in an otherwise accurate correlation between the measured fluid pressure and the magnitude of the aircraft load, an existing hollow cylindrical bearing structure, coaxially disposed between the piston and cylinder for guiding reciprocation of the former within the latter, is modified so that it can be rotated about the axis of the assembly. An actuator is provided on the strut for rotating the bearing structure with respect to the cylinder and piston. Such rotation minimizes axial friction forces in the assembly, allowing the fluid pressure to assume a value accurately reflecting the axial load.

10 Claims, 6 Drawing Figures

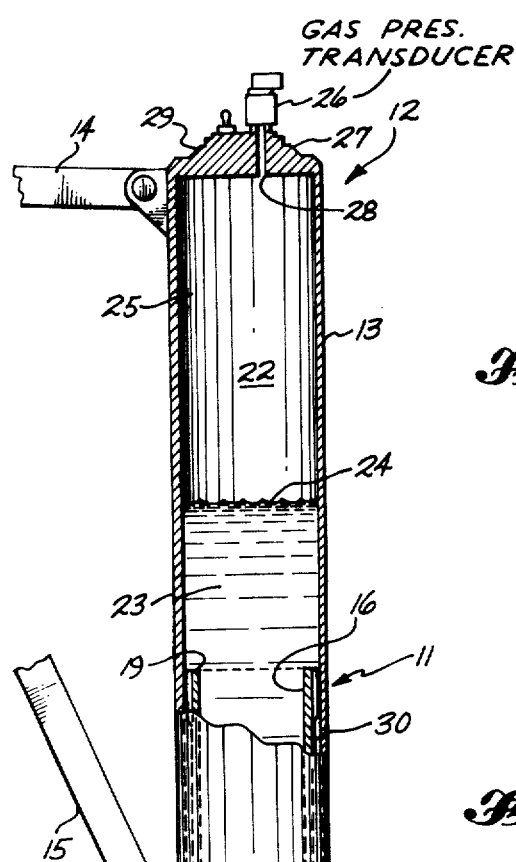
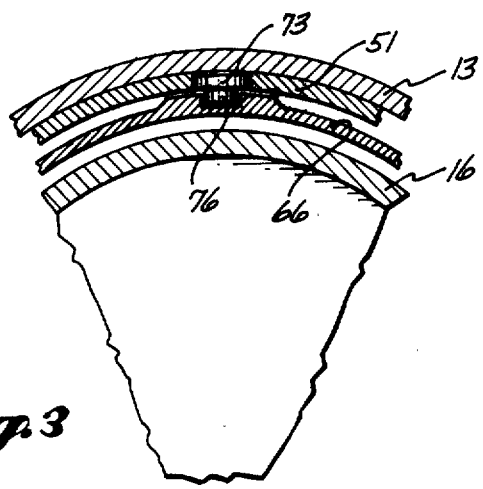
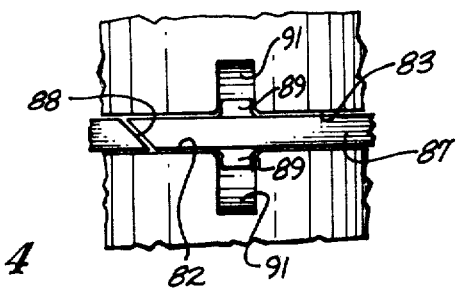
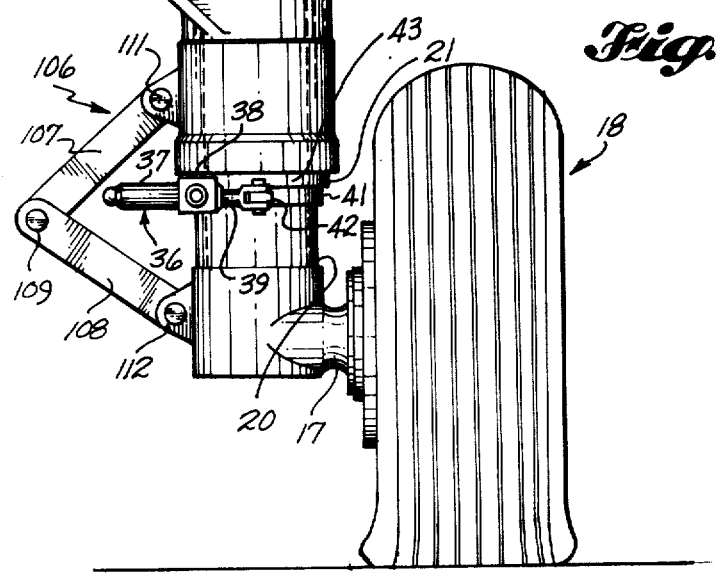

METHOD AND APPARATUS FOR MINIMIZING AXIAL FRICTION FORCES IN A CYLINDER-PISTON SHOCK ABSORBER

BACKGROUND OF THE INVENTION

This invention relates to shock absorbers and more particularly to piston-cylinder shock absorbers defining therewithin a variable volume fluid confining chamber, in which the axial load on the shock absorber may be ascertained by measuring the fluid pressure in such chamber.

This invention is an improvement over my previous U.S. Pat. No. 3,652,040, which issued Mar. 28, 1972, for a "LANDING GEAR SHOCK STRUT". The present invention, like the invention set forth in the above-identified U.S. Pat., is intended for minimizing frictional effects between the piston and cylinder of an aircraft shock strut, also referred to as an oleo strut, to afford an accurate measurement of the weight load carried by the strut. Typically, the shock strut includes a cylinder member and a piston member telescopically reciprocable therein, and defining therebetween a variable volume, fluid confining chamber adapted to receive one or more fluids, including compressible gasses such as air and incompressible liquids such as oil. The resulting structure affords various shock absorbing effects, such as spring cushioning and damping, desirable during landing and ground handling of the aircraft.

When the aircraft is at rest, the loaded weight thereof bears substantially axially on the shock strut, creating a counteracting fluid pressure force in the above-mentioned strut chamber. As is known, this internal fluid pressure can be measured to ascertain the magnitude of the weight or load resting on each of the shock struts, and from these measurements, the weight and balance of the aircraft can be computed.

It is also known, however, that the measurement of the fluid pressure is not always an accurate indication of the weight carried by the shock strut inasmuch as axially oriented frictional forces developed between the piston and cylinder introduce errors in the correlation between the fluid pressure and the load. In my aforementioned U.S. Pat. No. 3,652,040, these piston-cylinder frictional forces were substantially reduced by producing an oscillatory, relative rotation between the cylinder and piston members by a hydraulic actuator acting on the pivotal, apex joint of the torque linkage interconnecting the cylinder and piston members.

However, when the oscillatory actuator force is applied at the apex joint of the torque restraint linkage, a specially designed apex joint is required which must bear the rather substantial torque restraining loads that occur between the aircraft wheel or wheels, carried at the lower end of the strut piston, and the strut cylinder mounted to the aircraft body.

Additionally, the actuator in my U.S. Pat. No. 3,652,040 operates by effecting a relative rotation between the piston and cylinder. However, the main landing gears of many aircraft are not rotatably mounted with respect to the supporting shock strut cylinder. In such case, the only way to achieve the necessary relative rotation, is to cause a certain amount of pivotal tire deflection as the actuator rotates the piston relative to the strut cylinder. The resilience of the tire or tires does permit limited rotation of the shock strut piston relative to the stationary cylinder and aircraft body. However, for relatively large aircraft, and particularly those having multiple wheels on each landing gear, an undesirably large actuator force is required to achieve sufficient rotational displacement, especially when the wheel brakes are locked.

SUMMARY OF THE PRESENT INVENTION AND ITS OBJECTIVES

Accordingly, it is an object of the present invention to provide an improved method and apparatus for reducing axial friction forces in a shock assembly of the type including a cylinder, a piston and a variable volume fluid receiving chamber therebetween.

Another object of the present invention is to provide method and apparatus for reducing axial friction forces between the cylinder and piston of a shock strut assembly of the type having a ring shaped bearing structure coaxially mounted between the piston and cylinder for guiding axial reciprocation therebetween.

Another object of the present invention is to provide method and apparatus for reducing axial friction forces in a piston-cylinder shock strut assembly of an aircraft landing gear without requiring relative rotation between the piston and cylinder.

Another object of the present invention is provide method and apparatus for reducing axial friction forces in a cylinder-piston shock strut assembly for an aircraft without modifying the torque linkage interconnecting the cylinder and piston members.

Briefly, these objects are achieved by modifying a shock absorber assembly of the type including a right circular cylinder, a piston disposed for telescopic reciprocation therein, and annular bearing means coaxially disposed between and slidably engaging the walls of the cylinder and piston to serve as an axial reciprocation guide for the piston. In accordance with the present invention, the bearing means is mounted for rotation about the axis of the assembly. Connected to the bearing means, is an actuator means that is operable to rotate the bearing means relative to the cylinder and piston. The rotational displacement may be oscillatory or unidirectional. By rotatably displacing the bearing means when measuring the fluid pressure in the strut cylinder, axially oriented frictional forces associated with the reciprocation of the piston in the cylinder are substantially eliminated so that an accurate indication of the axial load supported by the assembly may be obtained. The extent to which the axial friction forces are eliminated depends on the amount and duration of rotation imparted to the bearing means, and as described more fully herein, these forces can be reduced to a point, where as a practical matter, they are negligible.

In a preferred form of the invention, the shock absorber forms a portion of an aircraft landing gear strut and the bearing means includes first and second axially spaced apart ring shaped sections disposed between the radially confronting inner and outer walls of the cylinder and piston respectively. When the landing gear is down, the shock absorber strut assumes a generally vertical orientation with the piston telescopically reciprocating from a lower end of the cylinder. To axially guide the piston, the first bearing section is positioned adjacent the upper end of the piston and the second bearing section is disposed adjacent the lower end of the cylinder. Annular seals, carried by each bearing section, sealingly confine the internal fluids. The actuator means, such as a hydraulic jack operated by an independent source of pressurized fluid, is mounted adjacent the lower end of the cylinder, and means mechanically connecting the actuator between the cylinder and the second bearing section effect relative rotation therebetween when the actuator is operated. Actuator effected rotation of the lower bearing section and its associated seals is transmitted to the upper bearing section and its seals by torque coupling means. Such coupling means causes the bearing sections to be rotated as a unit but permits relative axial displacement between the sections. The usual shock strut torque linkage that interconnects the cylinder and piston, restrains these members against relative rotation, such that actuated effected rotation of the bearing sections occurs with respect to both the cylinder and the piston.

These and further features, objects and various advantages of the present invention will become apparent to those skilled in the art from a consideration of the following detailed description and appended drawings of an exemplary embodiment thereof.

BRIEF DESCRIPTION OF THE DRAWINGS

FIG. 1 is an elevational view, partly in axial section, of the shock strut assembly constructed in accordance with one particular embodiment of the present invention.

FIG. 3 is a detail view of a portion of a transverse section of the strut assembly shown in FIGS. 1 and 2 taken generally along section lines 3—3 of FIG. 2.

FIG. 4 is another detail view of a portion of the assembly shown in FIGS. 1 and 2 as viewed from lines 4—4 of FIG. 2.

FIG. 5 is still another detail view of a portion of the assembly shown in FIG. 2.

DESCRIPTION OF THE PREFERRED EMBODIMENT

Figure 2:
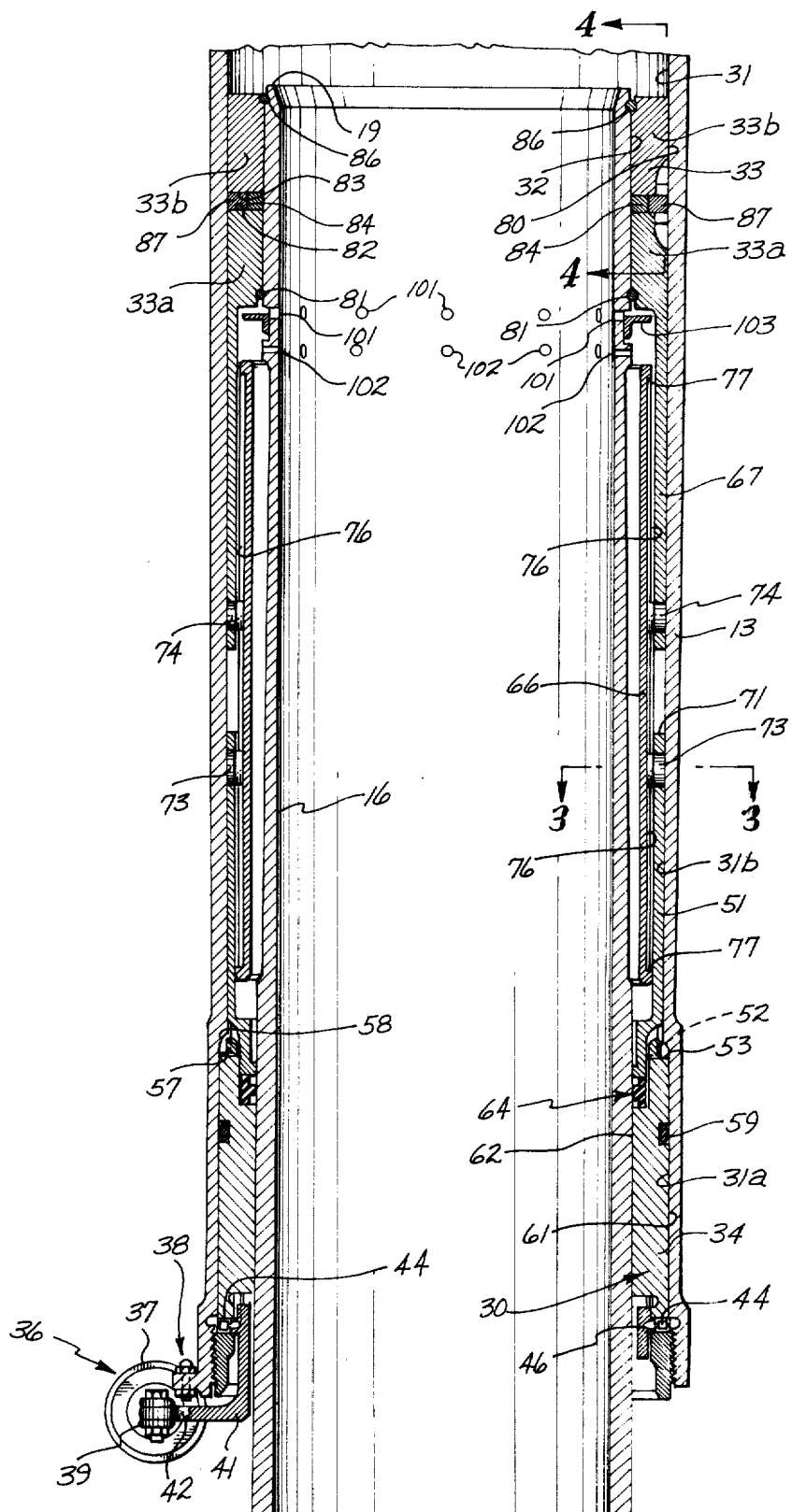
FIG. 2 is an axial sectional view taken generally along section lines 2—2 of FIG. 1.
Figure 6:
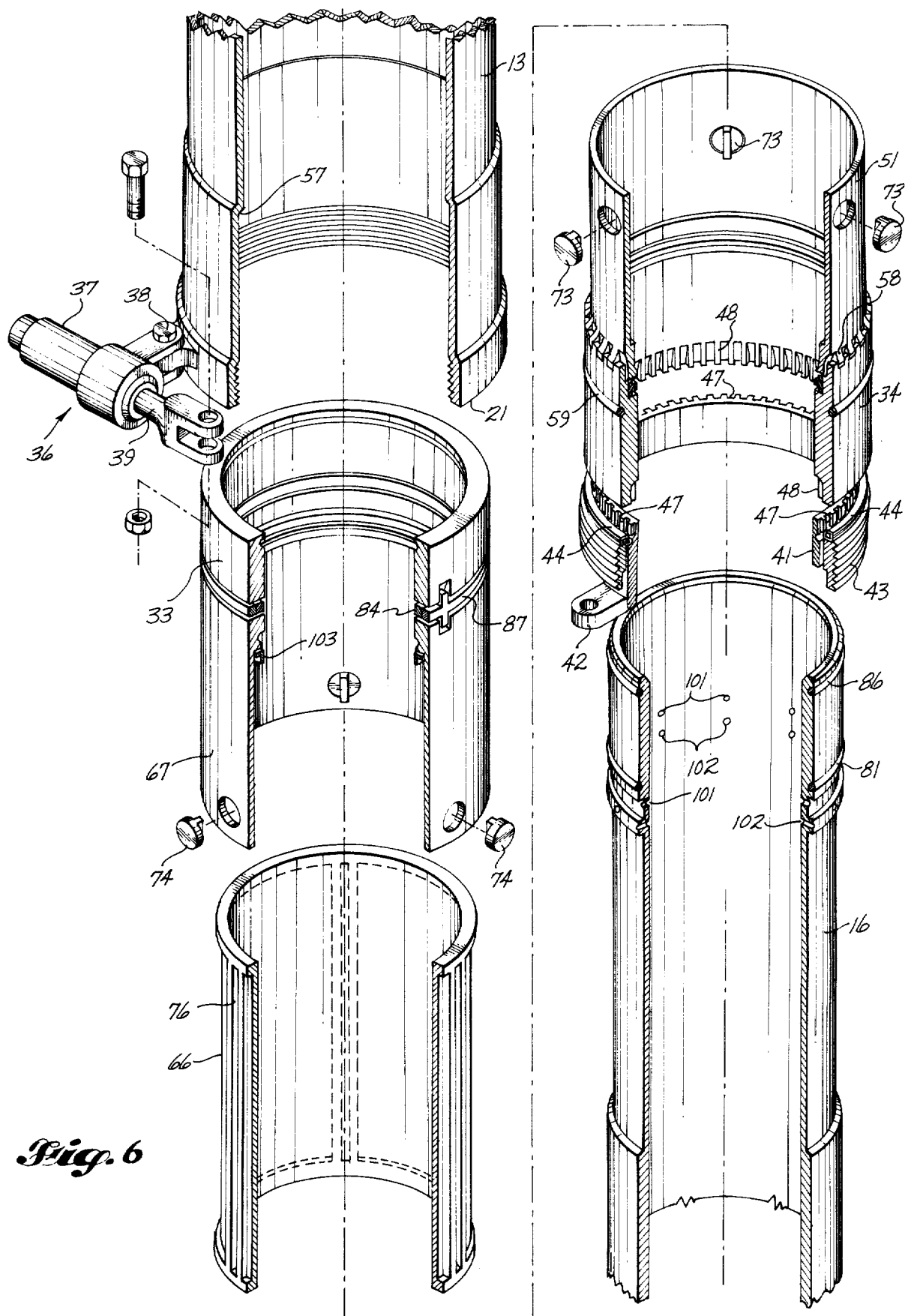
FIG. 6 is a partially exploded view of the assembly components shown in FIG. 2.

With reference to FIG. 1, the present invention is here embodied in a shock strut 11 of an aircraft landing gear 12. Strut 11 includes a shock absorber assembly having a right circular cylinder member 13 mounted in a known manner to a supporting structure of an aircraft (not shown) by means of braces 14 and 15. For landing and supporting the aircraft on the ground, the axis of cylinder 13 is disposed in a substantially vertical orientation. A piston 16 having upper and lower ends 19 and 20 respectively, is mounted for reciprocation telescopically within cylinder 13 with the piston's lower end 20 depending from a lower end 21 of the cylinder and carrying an axle assembly 17 for mounting a wheel 18 for rotation about an axis substantially transverse to the axis of the piston and cylinder.

To absorb axial shock loads on the strut during landing of the aircraft and to thereafter cushion the ride of the aircraft along the runway, strut 11 is provided with a fluid system cooperating with the cylinder and piston. In general, the piston and cylinder form a fluid confining chamber 22 containing one or more fluids, such as oil and/or air. In this instance, a combined oil and air fluid system is illustrated in which chamber 22 is partially filled with oil 23 to a level 24, with the remaining volume of the chamber being filled with a compressible gas, such as air 25. These fluids are subjected to compression and expansion commensurate with changes in the volume of chamber 22 as piston 16 reciprocates within cylinder 13 in response to the application of axial loads on the landing gear strut assembly.

When the airplane is grounded, it is known that the pressure of the fluid within chamber 22 bears a predetermined relationship to the weight or load exerted by the aircraft on the landing gear, and that such pressure may be measured by a transducer. By using such transducer measurement means, the load carried by each landing gear strut of an aircraft can be measured and combined to ascertain the gross weight and balance of the airplane. The utility of such measurement schemes is discussed, for example, in U.S. Pat. No. 3,517,550 issued to R. S. Leventhal on June 30, 1970 and U.S. Pat. No. 3,310,976 issued to B. Bussell et al on Mar. 28, 1967.

Although the configuration of the fluid confining structure and the number and types of fluids used therein may vary, the present invention is useful in connection with any cylinder and piston assembly having a fluid confining chamber, in which the internal pressure of the fluid therewithin is representative of an axial load placed on the assembly. By way of example, in this instance a gas pressure transducer 26 is mounted adjacent an upper end 27 of cylinder 13, and a passage 28 defined by an end closure 29 of cylinder 13 communicates the air pressure in the upper portion of chamber 22 with transducer 26.

With reference to FIGS. 1 and 2, an annular bearing structure 30, here in multiple ring shaped sections, is coaxially disposed between the radially confronting cylinder and piston walls 31 and 32 respectively. The bearing structure provides antifriction axial guide means maintaining the alignment of the cylinder and piston axes when the strut is subjected to transverse loading, or in general, any non-axial loading, and thereby minimizes binding between the cylinder and piston. The provision of an interposed bearing structure in a landing gear strut assembly is in general known as illustrated in my aforementioned U.S. Pat. No. 3,652,040.

Although the bearing structure serves to somewhat reduce both static and dynamic axial friction forces associated with the reciprocation of the piston within the cylinder, residual friction forces remain, and the components of these forces directed along the axis of the assembly, prevent the strut from being compressed or extended to the point where the load is supported by an equal, counteracting fluid pressure within the cylinder chamber. Thus, the fluid pressure within chamber 22 assumes a value that can be either less or more than the actual weight or load of the aircraft on the landing gear. In accordance with the present invention, the bearing structure 30 is mounted for rotation relative to both the piston and cylinder, and an actuator means is provided, here in the form of hydraulic jack actuator 36 mounted at the lower end 21 of cylinder 13, for rotating the interposed bearing. The bearing rotation creates a relative motion between the slidingly engaged parts that lies normal to the axial sliding motion between the bearings, piston and cylinder and causes the axial components of the friction forces to vector toward zero. This allows the full weight of the aircraft to be borne solely by the internal fluid pressure. Preferably, the circumferential displacement of the bearing structure should be substantially greater than the amount of anticipated axial movement (settling) between the piston and cylinder. A factor of 10 units of circumferential rotation of the bearing structure to 1 unit of axial settlement is preferred. The above noted amount of rotation can be satisfied by the accumulative total of the individual increments of oscillatory (back and forth), circumferential movement of the bearing means during the settling period, or by a continuous, unidirectional rotation thereof through an angle that corresponds to the desired amount of circumferential displacement. Additionally, it is preferable to continue the rotation of the bearing means for a time interval that is sufficient to allow the mass of the aircraft to settle on the adjusting shock struts. For this purpose a time interval of 1 to 2 seconds or more is usually adequate, depending on the size and loading of the aircraft.

Actuator 36 may provide an oscillatory rotation of the bearing structure and for this purpose may be a double acting hydraulic jack actuator of the type and operating in the manner disclosed in U.S. Pat. No. 3,652,040. Here actuator 36 may be of relatively small size and force producing capability and includes a cylinder portion 37 mounted to a lower end 21 of strut cylinder 13 to pivot about an axis parallel to that of cylinder 13 by a suitable pivot bracket means 38. A piston portion 39 of the actuator provides a rectilinear reciprocation stroke adjacent and generally tangent to the periphery of cylinder end 21. Means are provided for coupling portion 39 to a lower section of bearing structure 30 for transforming the oscillatory rectilinear reciprocation stroke of the actuator piston into an oscillatory rotation of the annular bearing structure 30.

Here, the actuator to bearing coupling means takes the form of an annular crank sleeve 41 having a radially outwardly extending crank arm 42. Adjacent the radially outermost end of arm 42, a pivotal connection is made to piston portion 39 to pivot about an axis transverse to the actuator's piston stroke and parallel to the axis of cylinder 13. Crank sleeve 41 is coaxially, rotatably mounted between cylinder 13 and piston 16. An exteriorally threaded annular gland nut 43 threaded into cooperating internal threads on cylinder 13 adjacent end 21 thereof retains a thrust bearing 44 against which the lower end of a lower section 34 of bearing structure 30. Nut 43 also has a circumferential shoulder that engages a complemental shoulder on sleeve 41 thereby restraining the latter against dislodgement from the end of the cylinder. Circumferentially spaced teeth 47 on the lower bearing section 34 engage complemental detents defined by teeth 48 on an upper axial end of sleeve 41, to transmit torque from the actuator rotated sleeve to the interposed bearing.

Bearing structure 30 includes axially split ring shaped bearing sections, namely, an upper section 33 and a lower section 34. The upper section 33 is rotatable about, but axially fixed on piston 16 for reciprocation therewith, while lower section 34 is axially fixed but rotatable with respect to cylinder 13. Although sections 33 and 34 may be formed of any suitable bearing metal, by way of example, a metallic alloy of aluminum-nickel-bronze has been found satisfactory.

Lower bearing section 34 is formed with a coaxial, torque sleeve 51, of hollow, cylindrical configuration and extending from an upper end of section 34. As described herein, sleeve 51 forms one of the components of the means for coupling rotational torque between the lower bearing section 34 and the upper bearing section 33.

For assembly purposes, section 34 and its torque sleeve 51 are formed in two parts that are connected for transmitting torque therebetween by means of detents or teeth 52 disposed at circumferentially spaced apart positions on an upper axial end 53 of bearing section 34, and complimental detents or teeth 54 provided adjacent a lower end 56 of sleeve 51. Bearing section 34 and sleeve 51 are restrained against relative axial movement with respect to the inner wall 31 of cylinder 13 by a circumferentially extending radial step 57 between a relatively larger inside diameter wall portion 31a of cylinder 13 adjacent the lower end 21 and a relatively lesser diameter wall portion 31b axially inwardly of end 21. Step 57 may be contoured in the axial dimension as shown, with the outer circumference of sleeve 51 being formed with a complimental contoured step 58, such that during assembly, sleeve 51 and bearing section 34 may be inserted from the lower end 21 of cylinder 13 until the step 58 on sleeve 51 engages step 57 on the interior cylinder wall.

An elastomeric O-ring 59 may be mounted in an exterior annular groove on the outer circumferential wall 61 of bearing section 34 to form a circumferential seal between wall 61 and cylinder wall portion 31a. While these walls undergo relative rotation, they remain stationary in the axial dimension and thus a relatively simple seal structure is adequate.

On the other hand, the inner circumferential wall 62 of bearing section 34 and an inner wall portion 63 of sleeve 51 are in both rotational and axially slidable engagement with the outer wall 32 of piston 16, and for this reason, a more durable, multiple part seal assembly indicated at 64 and of a type known to those known skilled in the art, may be utilized.

With reference to FIGS. 2 and 3, in order to couple the actuator effected rotation of lower bearing section 34 to upper bearing section 33, a torque coupling means is provided, including lower section sleeve 51 described above, a hollow, cylindrical torque tube 66, and an upper bearing section torque sleeve 67 similar to sleeve 51. These components are disposed in the radial free space between the outer circumferential wall 32 of piston 16 and the inner circumferential wall 31 of cylinder 13 axially between the upper and lower bearing sections. More particularly, torque tube 66 is provided with a length that bridges the axially adjacent ends 71 and 72 of sleeves 51 and 67 during relative displacement of ends 71 and 72 between an axially proximate relationship as shown in FIG. 2 and an axially distal relationship. Shear pin members 73 and 74 are fixedly carried by each sleeve adjacent ends 71 and 72 respectively and are each provided with a radially inwardly protruding portion for axially slidably engaging complimental, axially extending splines 76 provided on the exterior wall of torque tube 66. While at least one set of shear pin members 73 and 74 and cooperating spline 76 is required, it will be appreciated that a plurality of circumferentially spaced sets of pins and splines may be utilized as here shown in FIG. 2, in order to accommodate the existent torque load. Torque tube 66 may be provided with axial stops adjacent the ends thereof, such as here provided by the radially outwardly extending shoulders 77 engaging members 73 and 74 to limit the axial separation of the bearing sections and their associated torque sleeves.

The upper bearing section 33 is formed in two axially separable parts 33a and 33b, with the lower part 33a here being integrally formed with the torque sleeve 67. These parts are assembled and retained together in the following manner. First, a recoil valve ring 103 (described herein) having a piston ring type slot is installed. Then a spring loaded retaining ring 81 is snapped into a complimental circumferential groove on piston wall 32 axially spaced from upper end 19 thereof and the lower bearing section part 33a is coaxially slipped onto the upper end of the piston. Next, the upper part 33b is slipped over end 19 of the piston causing the confronting axial end faces 82 and 83 of the parts to engage. Subsequently, an axial spacer 84 will be inserted between faces 82 and 83. While faces 82 and 83, however, are still engaged, part 33b will have slid downwardly to an extent sufficient to mount a spring loaded upper locking ring 86 in a complimental, annular, circumferentially extending exterior groove on piston wall 32 adjacent upper end 19 of the piston. The parts 33a and 33b are now axially forced apart to the extent possible by the stops formed by retaining rings 81 and 86 and an axial spacer 84, formed in split-half sections is disposed between end faces 82 and 83.

To lock the assembly in place and to prevent relative rotation between the upper bearing section parts 33a and 33b, a radially inwardly biased resilient torque lock piston ring 87 having a single circumferential split 88 as shown in FIG. 4 is expanded and slipped over the upper bearing structure and snapped into a circumferentially extending groove formed by axial end faces 82 and 83 of parts 33a and 33b and the outer circumference of spacer 84. Ring 87 is formed with opposed, axially extending locking fingers 89, and the exterior walls of parts 33a ''and 33are formed with complimental, axially extending detents opening into end faces 82 and 83 and receiving fingers 89. Thus, the rotation of upper bearing sleeve 67 by means of splined torque tube 66 and shear pin members 74 effects rotation of parts 33a and 33b as a unit.

To improve damping characteristics during the retraction and extension of piston 16 within cylinder 13, oil ports 101 and 102 are provided, radially extending through piston 16, communicating oil 23 in the lower portion of chamber 22 with the region between the piston and cylinder wall 31. One set of these ports, here ports 101, may be selectively opened and closed by an axially floating, annular ring recoil valve member 103 that is washed downwardly to open ports 101 during a compression (retraction) stroke of piston 16 within the cylinder, and that floats upwardly to close ports 101 during an extension of piston 16. That latter occurs for example when the landing gear wheels leave the ground on takeoff and the weight of the unloaded wheels extends the shock strut. With ports 101 being opened during a shock absorbing compression of the piston, a relatively higher rate of oil flow into the outer annular chamber is permitted so as not to over dampen the compression stroke. On the other hand, during the extension of the piston 16 after takeoff, it is desirable to increase the damping, and this is accomplished by the automatic closing of ports 101 by member 103, leaving only ports 102 to pass the oil flow from the outer annular chamber back to the principal chamber 22.

The presently disclosed embodiment of the invention is intended for use in conjunction with a shock strut 11 equipped with a conventional torque linkage 106 including pivotally disposed links 107 and 108 connected together at an apex pivot joint 109 and individually, pivotally connected at the remote ends 111 and 112 to the cylinder 13 and piston 16 respectively. Torque linkage 106 prevents relative rotation between the piston and cylinder, and serves to maintain the proper angular orientation of the axle assembly 17 for wheel 18. With respect to the present invention, the torque linkage 106 prevents relative rotation between the cylinder and piston, such that rotation of the bearing structure 30 with respect to cylinder 13 by means of actuator 36 connected therebetween, also results in rotation of the bearing structure relative to piston 16. Thus, with the aircraft on the ground, actuator 36 may be operated in a manner, known per se, by hydraulic pressure to produce the above-described oscillatory rotation of the bearing structure. While the lower bearing section 34 rotates relative to both the cylinder and piston, the significant frictional interface of this bearing section is between the outer piston wall 32 and the inner wall 62 of bearing section 34 where axially sliding contact occurs. Similarly, the significant interface of the upper bearing section 33 is between the outer wall 80 of bearing section 33 and the inner cylinder wall 31. The relative rotation of the walls at these interfaces, normal to the axial, sliding motion of piston-cylinder assembly, produces the desired effect of substantially eliminating the axially oriented friction forces such that an accurate fluid pressure to axial load correlation can be obtained.

While only one particular embodiment of the present invention has been disclosed herein, it will be readily apparent to persons skilled in the art that numerous changes and modifications may be made thereto without departing from the spirit of the invention. For example, the embodiment disclosed herein provides an oscillatory rotation of the bearing structure with respect to the piston and cylinder. Alternatively, a continuous, unidirectional rotation of the bearing structure may be utilized in lieu of the oscillatory rotation. As an example of this modification, the crank sleeve, in lieu of crank arm 42, may be formed with circumferentially disposed, gear driveable teeth adjacent the lower axial end thereof, and actuation of the sleeve may be by gear means engaging and rotatably driving such teeth. The sleeve in such case may be driven so as to impart unidirectional rotation to the bearing structure, which rotation may be continuous during measurement of the fluid pressure. Another alternative embodiment may provide an electric motor drive in lieu of hydraulic actuator 36, with the electric motor having an over-center crank arm pivotally connected to arm 42 of sleeve 41. Still another alternative embodiment may provide for rotating only the lower bearing section, inasmuch as the shock struts on some aircraft landing gears exert only slight loading on the upper bearing. In such case, rotation of the lower bearing section, where the majority of the axially oriented friction forces originate, may be sufficient to permit an acceptable accuracy in the fluid pressure to load correlation. An example of a situation in which the immediately foregoing embodiment would be useful, is in shock strut assemblies having a lower bearing section of substantially greater axial length than the upper bearing section. Another embodiment related to this, would provide a single rotatable bearing structure, axially fixed to the cylinder, as in the case of the lower bearing section disclosed hereinabove, and with the upper bearing section being omitted. While a single stage shock strut has been disclosed herein, it will be recognized that the invention is applicable to multi-stage shocks, in which more than one fluid confining chamber is employed. In that case the bearing structure associated with only one of these chambers may be rotated, to obtain an accurate load measurement from the internal fluid pressure in such chamber.

Accordingly, the foregoing disclosure and description thereof are for illustrative purposes only and do not in any way limit the invention which is defined only by the following claims.

I claim:

1. In a shock absorber assembly including a circular cylinder member and a piston member disposed for axial reciprocation in said cylinder member, the combination with said cylinder and piston members comprising:
   bearing means of annular configuration disposed coaxially with and radially between said cylinder and piston members for supportively guiding the axial reciprocation of said piston member, said bearing means being formed and mounted for rotation about its axis relative to said members; and
   actuator means connected between said bearing means and at least one of said members for rotating said bearing means relative thereto.

2. The combination set forth in claim 1, wherein the shock absorber assembly further includes torque linkage means interconnecting said members for preventing relative rotation while permitting axial reciprocation therebetween, and wherein said actuator means includes relatively movable portions, one of said actuator portions being connected to said cylinder member and the other of said actuator portions being connected to said bearing means such that relative movement of said portions effects said rotation of said bearing means relative to both said cylinder member and said piston member.

3. The combination set forth in claim 2, wherein said movable portions of said actuator means are disposed for relative rectilinear reciprocation, and said actuator means includes means pivotally connecting said portions to said cylinder member and piston member respectively so as to translate said rectilinear reciprocation into oscillatory rotation of said bearing means.

4. The combination set forth in claim 1, wherein said bearing means includes first and second axially spaced apart ring shaped sections, said first section being rotatably mounted on and axially fixed to said piston member adjacent one end thereof and being axially and circumferentially slidably engaged with an interior wall of said cylinder member, said second bearing section being rotatably mounted on and axially fixed to said cylinder member adjacent one end thereof and being axially and circumferentially slidably engaged with an exterior wall of said piston member, torque coupling means interconnecting said first and second bearing sections for preventing rotation therebetween while permitting relative axial reciprocation therebetween, and said actuator means being connected to one of said bearing sections.

5. The combination set forth in claim 4, wherein said torque coupling means comprises: an extention sleeve on each of said first and second sections each said sleeve being oriented to project coaxially toward the other said sleeve, a tubular coupling member coaxially disposed between said exterior wall of said piston member and said interior wall of said cylinder member and axially bridging said sleeves, and axially oriented spline means interconnecting said coupling member and said sleeves.

6. The combination set forth in claim 4, wherein said actuator means includes an annular crank sleeve rotatably mounted in coaxial relationship with said cylinder member adjacent the end thereof at which said second bearing section is mounted, said crank sleeve having a radially outwardly extending crank arm and means connecting said crank arm to said actuator means for rotating said crank sleeve.

7. In an aircraft load measurement system of the type including a landing gear shock strut having a circular cylinder member, a piston member mounted for axial reciprocation in said cylinder member and cooperating therewith to define a variable volume fluid confining pressure chamber therebetween, a fluid within such chamber having a pressure representative of a load on said strut, and means for measuring said fluid pressure, the combination therewith comprising:
   annular bearing means coaxially disposed between said cylinder and piston members for axially guiding the reciprocation of said piston member within said cylinder member, said bearing means being formed and mounted for rotation about its axis relative to said members; and
   actuator means connected between said bearing means and at least one of said members for rotating said bearing means relative to said members during measurement of said fluid pressure, thereby minimizing axial friction effects between said piston and cylinder members so that the pressure of said fluid substantially equals the load on said strut.

8. The combination set forth in claim 7, wherein the load measurement system further includes torque linkage means interconnecting said cylinder and piston members preventing relative rotation therebetween, and wherein said actuator means includes first and second portions that are moved relative to each other during operation of said actuator means, means connecting said first portion to said cylinder member and said second portion to said bearing means so as to rotate said bearing means relative to said cylinder member in response to the relative motion of said portions, whereby such rotation relative to said cylinder member also effects rotation of said bearing means relative to said piston member.

9. An aircraft load measurement apparatus comprising a landing gear shock strut for supporting an aircraft on the ground and including a cylinder member and a piston member disposed for axial reciprocation in said cylinder member forming a variable volume fluid pressure chamber between said members, a fluid within said chamber subject to a compressive load on said strut and having a pressure representative of such load means for measuring said fluid pressure, and means for reducing axial friction forces between said piston member and cylinder member comprising an annular bearing means disposed coaxially with and radially between said cylinder and piston members for guiding axial reciprocation therebetween, said bearing means being disposed for rotation about its axis relative to said members, and actuator means mounted on said shock strut for rotating said bearing means relative to said piston and cylinder members during such pressure measurement.

10. In a method of determining the weight supported by an aircraft landing gear shock strut, including the steps of measuring the pressure of a fluid within a variable volume chamber defined between a shock strut cylinder and cooperating axially reciprocating piston wherein such piston is reciprocatively guided by an annular bearing structure disposed coaxially between the piston and cylinder, and concurrently reducing axially oriented friction forces between the piston and cylinder, the improvement in said step of reducing friction forces comprising rotating the bearing structure about its axis and relative to said piston and cylinder.

* * * * *